US010359988B2

(12) United States Patent
Yerli

(10) Patent No.: US 10,359,988 B2
(45) Date of Patent: Jul. 23, 2019

(54) SHARED EXPERIENCE OF VIRTUAL ENVIRONMENTS

(71) Applicant: TMRWLAND HONGKONG LIMITED, Kowloon Bay (HK)

(72) Inventor: Cevat Yerli, Frankfurt am Main (DE)

(73) Assignee: TMRWLAND HONGKONG LIMITED, Kowloon Bay (HK)

( * ) Notice: Subject to any disclaimer, the term of this patent is extended or adjusted under 35 U.S.C. 154(b) by 354 days.

(21) Appl. No.: 15/092,439

(22) Filed: Apr. 6, 2016

(65) Prior Publication Data
US 2017/0294044 A1 Oct. 12, 2017

(51) Int. Cl.
G06T 19/00 (2011.01)
H04L 29/08 (2006.01)
(Continued)

(52) U.S. Cl.
CPC .......... G06F 3/165 (2013.01); H04L 65/4069 (2013.01); H04L 65/80 (2013.01); H04L 67/04 (2013.01); H04L 67/1095 (2013.01); H04L 67/22 (2013.01); H04L 67/38 (2013.01); H04N 5/04 (2013.01); H04N 21/4302 (2013.01); H04N 21/8547 (2013.01); G06T 7/70 (2017.01); G06T 13/40 (2013.01); G06T 19/006 (2013.01);
(Continued)

(58) Field of Classification Search
CPC .. H04N 5/04; H04N 21/8547; H04N 21/4307; H04N 7/157; H04N 7/15; H04N 21/4302; G06T 19/006; G06T 7/70; G06T 2200/04; G06T 2207/30244; G06T 13/40; G06T 2219/024; G06T 2215/16; G06F 3/165; G06F 3/167; H04L 65/403; H04L 67/22; H04L 51/32; H04L 67/38; H04L 67/1095; H04L 67/04; H04L 65/4069; H04L 65/80
USPC .............. 709/204–206; 348/500, 515, 14.08; 345/633, 419; 715/752
See application file for complete search history.

(56) References Cited

U.S. PATENT DOCUMENTS 8,773,496 B2 * 7/2014 Sakai ...................... H04N 7/15
348/14.08
2011/0185286 A1 * 7/2011 Moyers ................ G06Q 10/10
715/752
(Continued)

Primary Examiner — Jungwon Chang
(74) Attorney, Agent, or Firm — Christensen O'Connor Johnson Kindness PLLC

(57) ABSTRACT

A system for providing a shared experience of virtual environments is disclosed. The system comprises a processing device for maintaining and rendering of a virtual environment to generate a plurality of visual components and a shared acoustic component representing the virtual environment, a plurality of interfaces connected to the processing device, each interface for connecting with a client device to continuously provide one of the plurality of visual components to the client device for display on the client device, and a sound device connected to the processing device for reproducing the shared acoustic component. The display of the plurality of visual components on respective client devices is synchronized with the reproduction of the shared acoustic component by the sound device. Furthermore, a method and a processing device for providing a shared experience of virtual environments and a corresponding client device are described.

17 Claims, 2 Drawing Sheets

(51) Int. Cl.
*G06F 3/16* (2006.01)
*H04L 29/06* (2006.01)
*H04N 5/04* (2006.01)
*H04N 21/43* (2011.01)
*H04N 21/8547* (2011.01)
*G06T 13/40* (2011.01)
*G06T 7/70* (2017.01)

(52) U.S. Cl.
CPC *G06T 2200/04* (2013.01); *G06T 2207/30244* (2013.01); *G06T 2215/16* (2013.01); *G06T 2219/024* (2013.01)

(56) References Cited

U.S. PATENT DOCUMENTS

| | | | |
|---|---|---|---|
| 2011/0221745 A1* | 9/2011 | Goldman | G06Q 30/02 345/419 |
| 2014/0285519 A1* | 9/2014 | Uusitalo | G06T 19/006 345/633 |
| 2015/0117664 A1* | 4/2015 | Mossner | H04R 1/1091 381/74 |
| 2016/0104452 A1* | 4/2016 | Guan | G06T 19/006 345/633 |
| 2016/0205488 A1* | 7/2016 | Gomez | H04S 5/00 381/17 |
| 2016/0234475 A1* | 8/2016 | Courchesne | H04N 7/157 |
| 2017/0206095 A1* | 7/2017 | Gibbs | G06F 3/167 |

* cited by examiner

SHARED EXPERIENCE OF VIRTUAL ENVIRONMENTS

TECHNICAL FIELD

The present disclosure relates to a system, a method and a processing device providing shared experiences of virtual environments. In particular, the present disclosure relates to a shared acoustic experience of a virtual environment.

BACKGROUND

In virtual reality or augmented reality systems, users are typically provided with information representing a virtual environment, such as a rendering of the virtual environment, which provides users with a sensation of a physical presence in computer-mediated places in the real world or an imagined world. Typically, virtual reality or augmented reality devices enable an experience of a virtual environment for individual users. A user may walk with respect to a virtual reality display or may move around in a room using a head-mounted display. The user may be tracked to determine a position and orientation of the user's head in order to provide representations of the virtual environment that correspond to a viewing perspective of the user. Even when multiple users are present at a location, representations of the virtual environment are generated for each individual user and provided to respective equipment of the user. Hence, each user experiences an individual representation of the virtual environment, which is decoupled from other users.

In other approaches, virtual environments may be experienced by a group of users simultaneously, for example, in a cinema or theater. However, in such approaches, the representation of the virtual environment is not individualized for each user, but corresponds to a generalized representation that is the same for all users. This may lead to a degraded experience of the virtual environment in each individual user due to a possible mismatch of the generalized presentation of the virtual environment with regard to individual parameters of each user.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

It is an object of the present disclosure to provide a shared, yet individualized experience of virtual environments for a group of users.

The problem is solved by a system, a method and a processing device for providing a shared experience of a virtual environment, as disclosed herein.

According to one aspect of the present disclosure, a system for providing a shared experience of virtual environments is provided. The system comprises a processing device for maintaining and rendering of a virtual environment to generate a plurality of visual components and a shared acoustic component representing the virtual environment, a plurality of interfaces connected to the processing device, each interface for connecting with a client device to continuously provide one of the plurality of visual components to the client device for display on the client device, and a sound device connected to the processing device for reproducing the shared acoustic component, wherein the display of the plurality of visual components on respective client devices is synchronized with the reproduction of the shared acoustic component by the sound device.

The visual components may be individualized for each user operating a respective client device. Hence, each user perceives an individualized visual component, which enables a highly realistic and immersive visual experience of the virtual environment. However, all users are provided with the same, shared acoustic component representing the virtual environment. The acoustic representation provides for a social link between the plurality of users operating respective client devices, which results in a shared experience of the virtual environment that is, however, visually individualized for each user.

The virtual environment may be maintained by the processing device. Preferably, the processing device may simulate virtual objects of the virtual environment using one or more engines, such as a physics engine, a graphics engine, other simulation engines, and the like, in any combination. The processing device may include a real-time 3D engine to enable a flexible simulation of the virtual environment. The processing device may utilize the one or more engines to render the virtual environment according to one or more modalities, including the visual modality and the acoustic modality, by providing respective visual and acoustic components, each representing the virtual environment. For example, a (visual) renderer may provide the plurality of visual components, which may preferably include a sequence of images or a video stream representing the virtual environment. The sequence of images or the video stream may include stereo image data, in order to enable a stereoscopic representation of the visual component of the virtual environment. The processing device may further utilize the renderer or an (acoustic) renderer to generate audio data representing the virtual environment, such as the shared acoustic component. The audio data may include acoustic information enabling a spatial representation of sound. Preferably, each visual component includes a video stream and the shared acoustic component includes an audio stream representing the virtual environment.

The virtual environment may be further simulated and rendered according to any other modality, such as the haptic, gustatoric or olfactoric modality, in any combination. One or more of these components may be provided individually by respective client devices or in a shared way via corresponding output devices of the system for the group of users.

Each one of the plurality of visual components may be individualized for a particular user operating a corresponding client device, based on parameters provided by the client device. The shared acoustic component may be generated based on parameters that most closely resemble characteristics of all client devices, such as by using parameters of an average device, which may be, for example, located in a center of a location of the system with respect to the sound device, and/or parameters of a room or location of the presentation of the virtual environment. However, even though the shared acoustic component may not exactly match parameters of individual client devices, the overall quality of the experience of the virtual environment remains high since the visual components are individualized for each user and since the shared acoustic component links the group of users that experience the virtual environment together.

The plurality of interfaces enables a flexible and efficient connection of the plurality of client devices to the system. For example, the client devices may be operated by a user to connect to one of the interfaces, to register and authenticate with the system and/or to receive respective individualized visual components.

Each client device may include at least one visual output device for providing the user with the visual component, such as one or more displays or projection means. For example, the client device may include a portable display, a head-mounted display or a see-through display for providing the visual representation of the virtual environment according to the visual component.

The sound device may preferably include one or more loudspeakers, which may be configured to provide a spatial acoustic experience of the virtual environment as defined by the shared acoustic component. Hence, the user operating a respective client device may perceive the visual representation of the virtual environment via the individual client device, and the acoustic representation of the virtual environment via the shared sound device of the system. Since the display of the visual component on respective client devices is synchronized with the reproduction of the shared acoustic component, the system provides for a highly immersive, yet shared and social experience of the virtual environment.

According to one embodiment, the sound device is arranged in a (real) environment. Preferably, the interfaces are configured to connect with the client devices in the (real) environment. The sound device providing the shared acoustic experience of the virtual environment may be located in a room, hall, theater or cinema, or in an open area, such as an urban open space or a public space or any other location. The (real) environment may be further defined by a range of the interfaces, which enable a connection to the client devices. The interfaces and the sound device may be arranged in the same (real) environment to provide the shared acoustic experience of the virtual environment and the individualized visual components to the client devices in the (real) environment. Hence, users operating the client devices may experience the virtual environment in the same physical location.

In another embodiment, each interface continuously receives and forwards parameters of the client device to the processing device. Preferably, the visual components are individualized for the client devices based on respective parameters of the client devices. The parameters may include an indication of a camera perspective associated with a client device. Each visual component may include a rendering of the virtual environment for the client device according to the camera perspective associated with the client device. For example, the processing device may simulate the virtual environment, which may include a plurality of virtual cameras and each visual component may correspond to a rendering of the virtual environment from a perspective of one of the plurality of virtual cameras. The camera perspective of the virtual camera may be adjusted according to the parameters received from the client device, indicating the camera perspective associated with the client device. The visual component may be adjusted to a current camera perspective of the client device to provide an experience of the virtual environment matching the respective client device. The parameters may additionally or as an alternative include configuration parameters and settings of the client device in order to indicate to the processing device a rendering mode or characteristic. For example, client devices may be equipped with one or more displays to provide the visual component in a stereoscopic way, in a particular format, with a particular resolution and/or refresh rate, according to a speed or velocity of the client device, based on ambient light conditions and other parameters, in any combination, which may be transmitted as parameters in order to appropriately adjust the rendering of the visual component for the client device. For example, the processing device may adapt the resolution or the refresh rate of the video stream of the visual component to match the parameters of the client device.

In an embodiment, the camera perspective is defined based on one or more of a position and orientation of the client device, and a position and orientation of the user of the client device. The client device may be a head-mounted display or a see-through display that may be worn by a user on his or her head. Hence, a position and orientation of the client device may directly define a camera perspective. Furthermore, the camera perspective may take into consideration a gaze of the user, for example by using a gaze tracker, in order to accentuate or adapt an area of the rendering based on the determined gaze. The perspective may be further defined by a position and orientation of a user of the client device, for example, by using a head tracker or eye gaze tracker to refine or confirm the position and orientation of the client device. Furthermore, the position and orientation of the user may be utilized if one or more displays of the client device are not directly attached to the head of the user, which may be the case when using tablets for displaying the visual component of the virtual environment. In order to determine a correct camera perspective for the virtual camera of the virtual environment, the position and orientation of (a display) of a client device has to be considered in relation to a position and orientation of a head of a user, which may further take into consideration the gaze of the user. It is to be understood that a client device may include a plurality of displays, and each display of the client device may provide a position and orientation in order to determine correct camera perspectives for each display of the client device.

In another embodiment, the parameters include an indication of an interaction of a user of the client device with the virtual environment. The client device may include one or more input devices which may be configured to provide input data indicating the interaction of the user with the virtual environment. For example, a display of the client device may be a touch-sensitive display and the user may interact with the display in order to interact with the virtual environment. Furthermore, the client device may include one or more input devices which may be operated by the user to trigger or invoke actions in the virtual environment. The client device may include or be connected to a tracker, which may track a position and orientation of limbs of the user, which may be used to determine parameters of the interaction of the user with the virtual environment. For example, the user may interact with the virtual environment by moving his arms or by making a gesture with his hands. The respective motion or gesture may be tracked by the tracking system and processed in order to determine an indication of the interaction of the user with the virtual environment. Further interaction capabilities include acoustic interaction, comprising detecting and analyzing spoken words or commands, haptic interaction using a force feedback device, or the like, wherein input devices may be included in the client device or the system or may be connected to the client device.

In yet another embodiment, said maintaining includes simulating the virtual environment based on one or more interactions of users with the virtual environment. The processing device may collect the interactions received via respective interfaces from a plurality of the client devices and may use the interactions to adjust the virtual environment. For example, the virtual environment may include a plurality of virtual objects, which may interact with each other according to a physical simulation of the virtual environment, and the virtual objects may include parameters which may be adjusted by respective interactions from the users. For example, an interaction may indicate that a virtual object may be moved or rotated in the virtual environment. Furthermore, an interaction may trigger a functionality or action within the virtual environment, which may affect simulation of the virtual environment or interaction of the virtual objects with each other. In order to provide a shared experience of the virtual environment, all interactions from the individual client devices may be combined and may jointly affect the simulation of the virtual environment, which is thereafter rendered in individual visual components for each client device, and in a shared acoustic component that is provided to all users via the sound device.

In an embodiment, the processing device includes a real-time engine to simulate and render the virtual environment. Preferably, the real-time engine is a real-time 3D engine. The real-time engine may provide for real-time simulation of the virtual objects in the virtual environment. Simulation of individual virtual objects may be prioritized in order to fulfill real-time requirements of the virtual environments. The real-time engine may provide for one or more of real-time physical simulation, character animation, particle based systems, simulation of visuals and physically based rendering, thereby enabling a highly realistic visual rendering of highly realistic virtual environments for individual client devices, in respective visual components.

In yet another embodiment, the sound device includes a loudspeaker array. The loudspeaker array may be arranged in such a way to provide a highly realistic spatial reproduction of the shared acoustic component of the virtual environment in the location or room hosting the shared experience of the virtual environment. For example, the sound device may include a plurality of loudspeakers equally distributed around the location or space and each loudspeaker may be individually addressed by the shared acoustic component to provide the spatial representation of sound within the room or location. Hence, for example by moving around in the location or room, the users may experience a different reproduction of the acoustic component according to their position and orientation with respect to individual loudspeakers of the array.

In yet another embodiment, each interface defines a link between the processing device and the client device for direct streaming of the visual component of the virtual environment to the client device. In an initial state, the connection with the interface may be established using known communication protocols, such as protocols for wireless communication in a WiFi network. Thereafter, a direct link may be established, which enables a prioritized streaming of the visual component from the processing device to the client device and/or a receipt of the parameters from the client device that are directly forwarded to the processing device. This enables an efficient streaming of visual components to individual client devices and corresponding forwarding of parameters from the client devices to the processing device in order to enable a seamless experience of the virtual environment.

In an embodiment, the display of the plurality of visual components on respective client devices is synchronized with the reproduction of the shared acoustic component on the sound device by determining a delay in transmission of each visual component to the respective client device. During an initial handshake or after establishment of the link between the processing device and the client device, the processing device may determine a round-trip-time (RTT), which may also include a variance and/or an indicator of a stability of the link. The RTT and any further corresponding indicator may be used to determine an expected delay of the transmission of the visual components to the client device. Accordingly, the visual component may be streamed in advance to the client device according to the determined delay. The determination of delay may be performed during initial establishment of the link and may be repeated according to regular or irregular intervals during provision of the visual component in order to adjust streaming of the visual component to the client device according to a current expected delay in transmission. The processing device may further determine a delay in reproduction of the shared acoustic component to the sound device, for example, by transmitting the shared acoustic component to the sound device and by measuring the delay in the reproduction of the shared acoustic component, for example, by using one or more microphones of the system. The determination of a delay in reproduction of the shared acoustic component may be performed during an initial set-up of the system and does not need to be repeated subsequently since the set-up of the sound device and the processing device will typically not change during provision of the virtual environment. The reproduction delay and the transmission delays may be further considered during synchronization of the visual components with the acoustic component. Preferably, each interface is further configured to transmit signals for measuring a delay in transmission to the respective client device. The delay may be determined for each interface individually and respective information may be provided to the processing device.

In another embodiment, the display of the plurality of visual components on respective client devices is synchronized with the reproduction of the shared acoustic component on the sound device by defining synchronization points in the visual components and specifying timing information for displaying the visual component at the synchronization point. After determination of an expected delay in transmission for each visual component to respective client devices, the delay information may be used as timing information for display of the visual components according to one or more synchronization points. The synchronization points may be inserted into a video stream of the visual components at corresponding positions and the timing information may differ for each individual client device based on the corresponding delay in transmission. After setup of the system and establishing connections to the client devices, the processing device may start streaming of visual components and initiate reproduction of the shared acoustic component at the sound device, such that the visual components are displayed at corresponding synchronization points based on the timing information at each individual client device. This enables a synchronized provision of a plurality of visual components on a variety of client devices, which is synchronized with the reproduction of the shared acoustic component at the sound device of the system.

In yet another embodiment, the client devices include a virtual reality device, an augmented reality device or a mixed reality device. The client device may be an electronic device including one or more output devices for displaying the visual component of the virtual environment to a user of the electronic device, such as a mobile device, or a smartphone. The client device may include one or more input devices, one or more tracking devices, and the like, in any combination in order to enable a determination of parameters of the client device for rendering of the virtual environment.

According to another aspect of the present disclosure, a method for providing a shared experience of virtual environments is provided. The method comprises the steps of maintaining and rendering of a virtual environment to generate a plurality of visual components and a shared acoustic component representing the virtual environment, connecting, via a plurality of interfaces, to a plurality of client devices to continuously transmit a visual component of the plurality of visual components to a respective client device for display on the client device, and reproducing the shared acoustic component on a sound device, wherein the display of the plurality of visual components on respective client devices and the reproduction of the shared acoustic component by the sound device are synchronized.

According to yet another aspect a computer-readable, non-transitory medium is provided, wherein the medium stores one or more instructions that, when executed on a computing device, configure the computing device to perform a method according to one embodiment of the present disclosure.

In yet another aspect of the present disclosure, a processing device for providing a shared experience of virtual environments is provided, wherein the processing device comprises a real-time 3D engine configured to maintain and render a virtual environment, thereby generating a plurality of visual components and a shared acoustic component representing the virtual environment, an output to connect the processing device to a plurality of client devices to continuously provide one of the plurality of visual components to each client device for display on the client device, wherein the shared acoustic component is provided to and reproduced on a sound device connected to the processing device, and a synchronizer configured to synchronize the display of the plurality of visual components on respective client devices with the reproduction of the shared acoustic component by the sound device.

The processing device according to one embodiment may be for use in the system according to one or more embodiments of the present disclosure. Furthermore, the system and the processing device according to one or more embodiments of the present disclosure may be configured to perform a method according to one or more embodiments of the present disclosure. Likewise, the method according to one or more embodiments of the present disclosure may include processing steps reflecting a configuration of components of the system or of the processing device according to one or more embodiments of the present disclosure, in any combination.

In yet another aspect, the present disclosure refers to a client device for use in a system according to one embodiment of the present disclosure. The client device may enable a shared experience of a virtual environment by displaying an individualized visual component of a rendering of the virtual environment received from the system, which may be synchronized with a reproduction of a shared acoustic component of the virtual environment by a sound device of the system.

BRIEF DESCRIPTION OF THE DRAWINGS

The specific features, aspects and advantages of the present disclosure will be better understood with regard to the following description and accompanying drawings where.

DETAILED DESCRIPTION

In the following description, reference is made to drawings which show by way of illustration various embodiments. Also, various embodiments will be described by referring to several examples. It is to be understood that the embodiments may include changes in design and structure without departing from the scope of the claimed subject matter.

Figure 1:
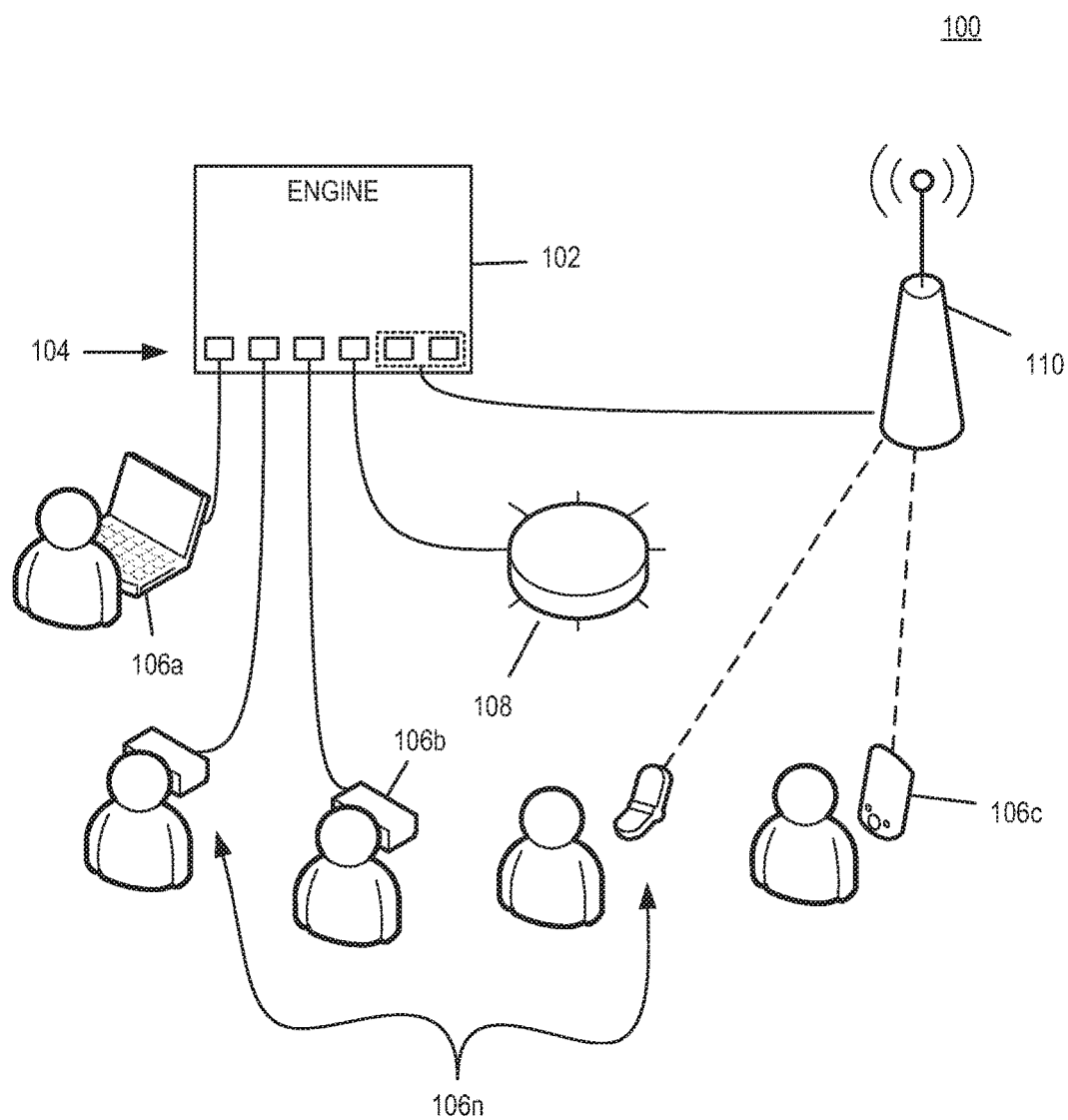
FIG. 1 shows a schematic overview of a system according to one embodiment.

FIG. 1 shows a schematic overview of a system for providing a shared experience of virtual environments according to one embodiment of the present disclosure. The system 100 may include a processing device 102, which may comprise or execute a real-time 3D engine. The processing device may further include a plurality of interfaces 104 for connecting the processing device 102 with client devices, other communication devices or output devices, such as a plurality of client devices 106a, 106b, 106c, and 106n, and a sound source 108. It is to be understood that even though FIG. 1 shows a single sound source 108 and five client devices 106a, 106b, 106c, and 106n, embodiments of the present disclosure may include any number of shared output devices, such as two or more sound sources, and/or any number of client devices. Furthermore, the number of client devices may change dynamically during the shared experience of the virtual environment.

The interfaces 104 may be wired interfaces for connecting with client devices 106a, 106b. At least some of the interfaces 104 may be wireless interfaces, which may connect the processing device 102 with client devices, such as client device 106c, via one or more access points 110, as indicated by the dotted line between the access point 110 and the client device 106c. Accordingly, the client devices 106a, 106b, 106c, and 106n may be electronic devices which connect to the processing device 102 either via a wired connection or a wireless connection.

The processing device 102 may utilize the real-time 3D engine to maintain and render a virtual environment. The rendering may include a plurality of visual components that may each be individualized for a respective client device 106a, 106b, 106c, and 106n for display on the respective client device 106a, 106b, 106c, and 106n. For example, client device 106a may be a portable computing device, such as a laptop, which may include a screen for displaying the corresponding visual component of the virtual environment. Client device 106b may be a head-mounted display or a see-through display, which may display the visual component on respective display devices in front of the eyes of the user. Client device 106c may be a mobile device, such as a smartphone or a tablet device including corresponding displays for displaying the respective visual component. Furthermore, either the system or each client device 106a, 106b, 106c, and 106n may include a tracker for determining a position and orientation of the client devices 106a, 106b, 106c, and 106n within a real environment of the system 100. The client devices 106a, 106b, 106c, and 106n may transmit the corresponding position and orientation to the processing device 102 that may be used by the processing device 102 to adjust the visual rendering of the virtual environment.

It is to be understood that even though individual client devices are shown in FIG. 1 as either being connected with the processing device using a wired or a wireless connection, the client devices are not restricted to a particular connection type. Rather, a client device may include various means for connecting to interfaces 104 of the processing device 102. For example, the client devices 106a and 106b may connect to the processing device 102 via a wireless connection using the access point 110. Furthermore, it is to be understood that at least some of the client devices 106a, 106b, 106c, and 106n may be integrated into the system. A client device may be fixed to a particular position, such as on a seat of a theater or cinema of the system.

The sound source 108 may include an array of loudspeakers that may be distributed in the environment of the system 100 in order to provide spatial reproduction of sound. The processing device 102 may acoustically render the virtual environment and provide a shared acoustic component to the sound source 108 for reproduction. The system 100 may be directed at a plurality of users in a physical location operating respective client devices 106a, 106b, 106c, and 106n and the processing device 102, which may act as a server, may stream individualized visual components to respective users and provide the shared acoustic component to the sound source 108. The processing device 102 may further synchronize the reproduction of the shared acoustic experience on sound source 108 with the display of the visual components on each individual client device 106a, 106b, 106c, and 106n, thereby providing a shared experience of the virtual environment in the same physical location for all users.

The processing device 102 may further provide to the client devices 106a, 106b, 106c, and 106n an application, which may configure the client devices 106a, 106b, 106c, and 106n to receive and display the visual components of the virtual environment in a synchronized way. The client devices 106a, 106b, 106c, and 106n may be initially connected to the system 100, receive and install the application in order to start the shared experience of the virtual environment without any further configuration of the client devices 106a, 106b, 106c, and 106n.

Figure 2:
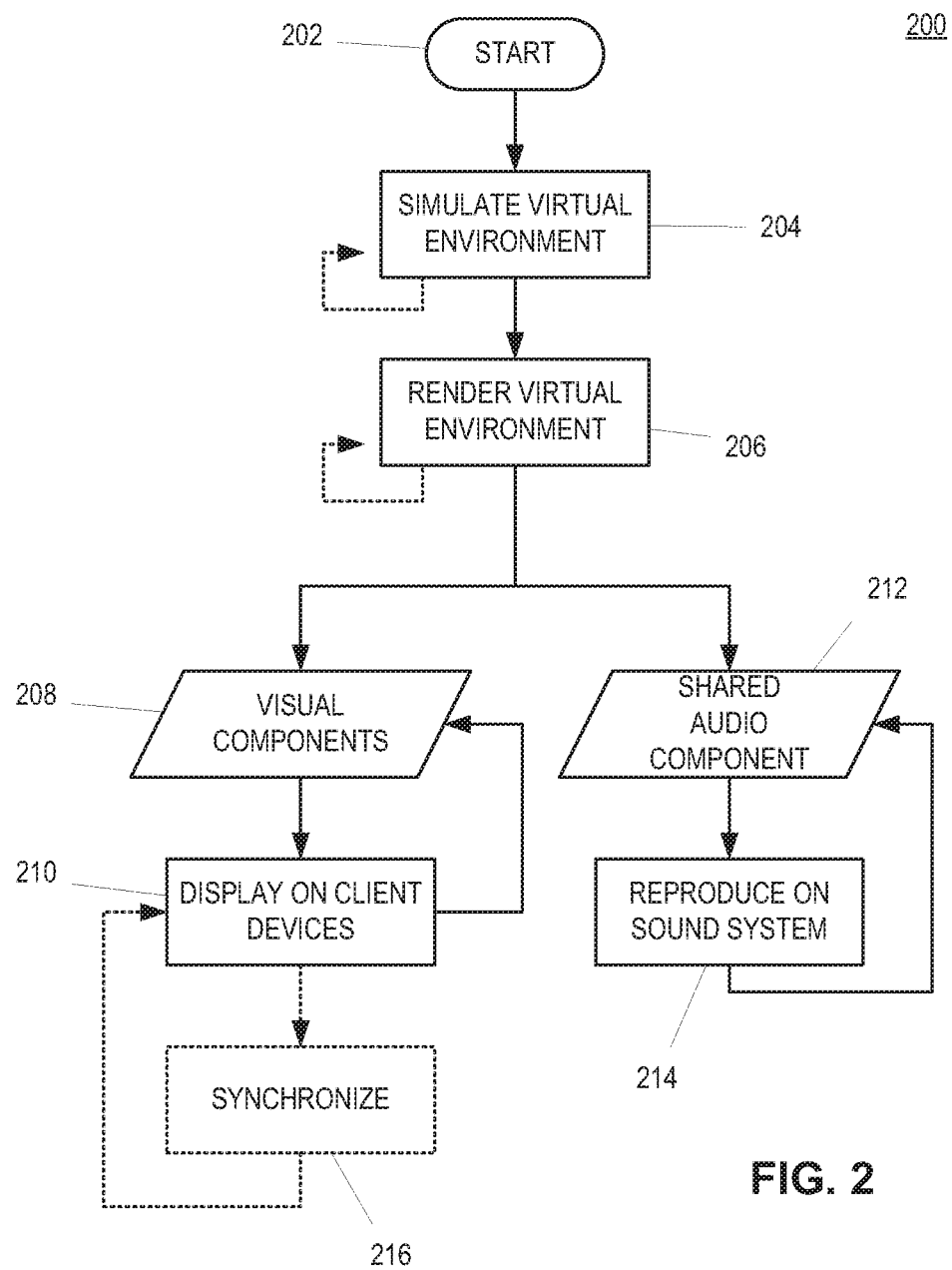
FIG. 2 shows a flow chart of a method for providing a shared experience of virtual environments according to one embodiment.

FIG. 2 shows a flow chart of a method according to one embodiment of the present disclosure. The method 200 may start in item 202, for example, in response to initiation of a session directed at a shared experience of a virtual environment.

The method 200 may proceed with item 204 by simulating a virtual environment. For example, an engine of a processing device may be set up with virtual objects and other components of a virtual environment and may simulate the virtual environment according to a plurality of rules and laws. As indicated by the dotted line, the simulation may be continuously reiterated to maintain the virtual environment according to consecutive states of the simulation.

The method 200 may proceed with item 206, where the virtual environment may be rendered. The rendering may take into account a current state of the virtual environment as simulated in item 204 and may provide a rendering of the virtual environment according to one or more modalities, including the visual and the acoustic modality, as well as preferably a haptic, a gustatoric, and/or an olfactoric modality, in any combination. As indicated by the dotted line, the rendering in item 206 may be continuously repeated according to a current state of the virtual environment as simulated in item 204.

The rendering may result in a plurality of visual components 208, wherein each visual component may be individualized according to parameters of a client device, for example, based on a camera perspective associated with the client device. The visual components 208 may be transmitted, transferred or streamed to the respective client devices and displayed on each client device in item 210.

The rendering in item 206 may further generate a shared audio component 212, which may be a single shared audio component 212 for all client devices. The shared audio component 212 may be or may form part of a shared acoustic component as used in embodiments of the present disclosure, such as the shared acoustic component rendered on sound source 108, as described with regard to FIG. 1. The shared audio component 212 may be transmitted to a shared sound system, such as the sound source 108 shown in FIG. 1, and may be reproduced on the sound system in item 214.

The method 200 enables a shared experience of the virtual environment by providing individualized visual components 208 to respective client devices to provide an individual experience of the virtual environment for each user, however, by providing a single shared audio component 212 to all users, thereby increasing the sociality of the group of users. The users may also hear each other's reactions in combination with the shared audio representation 212 of the virtual environment, which further increases the immersive shared experience.

The method 200 further includes a synchronization of the client devices in item 216, wherein the display of the visual component 208 on each client device in item 210 is synchronized with the reproduction of the shared audio component 212 on the sound system. For example, the processing device may determine a delay of transmission of the visual components 208 to the individual client devices in relation to a delay of reproduction of the shared audio component 212. The client devices may be provided with the visual components 208 in advance and instructed to display the visual components 208 with a particular delay or at a particular point in time according to the determined delay and/or synchronization points included in the visual components 208.

The method 200 may end responsive to a termination of the shared experience.

The method and the system according to embodiments of the present disclosure are applicable in one or more use cases.

In one use case, at least two users are located in a physical location. A server, such as the system according to one embodiment, may stream, share or provide visual content to client devices of the users. The server may further provide applications to client devices of the users for execution on the client devices in order to provide visual content that may be synchronized with provision of the visual content on other devices of other users. The visual experience may be provided by the server, which may, for example, stream a video stream, or upload respective visual information or data to the individual user client devices. Upon execution of an application, the visual experience may be provided to each user through their client devices, such as smart devices, mobile phones, smartphones or tablets, which may be configured to provide virtual reality, augmented reality or mixed reality content. An associated sound experience related to the visual experience of the virtual environment may be provided by the server, but may be played on the location's own sound system or an external sound system. The sound source may be independent from the personal user's screens of the client devices. The sound playback may be synchronized with the user's visual playback execution.

Accordingly, the users may get sociality from other users whose reactions can be heard by other users, thereby enabling a shared experience of virtual environments in a highly realistic and immersive way.

While some embodiments have been described in detail, it is to be understood that the aspects of the present disclosure can take many forms. In particular, the claimed subject matter may be practiced or implemented differently from the examples described and the described features and characteristics may be practiced or implemented in any combination. The embodiments shown herein are intended to illustrate rather than to limit the invention as defined by the claims.

The embodiments of the invention in which an exclusive property or privilege is claimed are defined as follows:

1. A system for providing a shared experience of virtual environments, comprising:
   a processing device for maintaining and rendering of a virtual environment to generate a plurality of visual components rendered for display and a shared acoustic component representing the virtual environment;
   a plurality of interfaces connected to the processing device, each interface for connecting with a client device to continuously provide one of the plurality of visual components rendered for display to the client device for display on the client device, wherein each interface continuously receives and forwards parameters of the client device to the processing device, the parameters including location parameters, and wherein the visual components are individualized by the processing device for the client device based on respective parameters of the client device, such that the client device need not itself render the visual component for display; and
   a sound device connected to the processing device for reproducing the shared acoustic component, wherein the shared acoustic component is generalized by the processing device based at least in part on the location parameters of a plurality of client devices,
   wherein the display of the plurality of visual components on respective client devices is synchronized with the reproduction of the shared acoustic component by the sound device.

2. The system according to claim 1, wherein the sound device is arranged in a real environment and wherein the interfaces are configured to connect with the client devices in the real environment.

3. The system according to claim 1, wherein the parameters include an indication of a camera perspective associated with the client device.

4. The system according to claim 3, wherein the visual component includes a rendering of the virtual environment for the client device according to the camera perspective associated with the client device.

5. The system according to claim 3, wherein the camera perspective is defined based on one or more of a position and orientation of the client device, and a position and orientation of a user of the client device.

6. The system according to claim 1, wherein the parameters include an indication of an interaction of a user of the client device with the virtual environment.

7. The system according to claim 1, wherein said maintaining includes simulating the virtual environment based on one or more interactions of users with the virtual environment.

8. The system according to claim 1, wherein the processing device includes a real-time 3D engine to simulate and render the virtual environment.

9. The system according to claim 1, wherein the sound device includes at least one loudspeaker or a loudspeaker array.

10. The system according to claim 1, wherein each interface defines a link between the processing device and the client device for direct streaming of the visual component of the virtual environment to the client device.

11. The system according to claim 1, wherein the display of the plurality of visual components on respective client devices is synchronized with the reproduction of the shared acoustic component on the sound device by determining a delay in transmission of each visual component to the respective client device.

12. The system according to claim 1, wherein each interface is configured to transmit signals for measuring a delay in transmission to the respective client device.

13. The system according to claim 1, wherein the display of the plurality of visual components on respective client devices is synchronized with the reproduction of the shared acoustic component on the sound device by defining synchronization points in the visual components and specifying timing information for displaying the visual component at the synchronization point.

14. The system according to claim 1, wherein each visual component includes a video stream and the shared acoustic component includes an audio stream representing the virtual environment.

15. The system according to claim 1, wherein the client devices include a virtual reality device, an augmented reality device, a mobile device, or a smartphone.

16. A method for providing a shared experience of virtual environments performed by a system comprising a processing device, a plurality of interfaces connected to the processing device, and a sound device connected to the processing device, the method comprising:
   by the processing device, maintaining and rendering a virtual environment to generate a plurality of visual components rendered for display and a shared acoustic component representing the virtual environment;
   connecting, via the plurality of interfaces, to a plurality of client devices to continuously transmit a visual component of the plurality of visual components rendered for display to a respective client device for display on the client device;
   receiving and forwarding parameters of the client device to the processing device, wherein the visual components are individualized by the processing device for the client device based on respective parameters of the client device, the parameters including location parameters, such that the client device need not itself render the visual component for display; and
   reproducing the shared acoustic component on the sound device, wherein the shared acoustic component is generalized by the processing device based at least in part on the location parameters of a plurality of client devices,
   wherein the display of the plurality of visual components on respective client devices and the reproduction of the shared acoustic component by the sound device are synchronized.

17. A processing device for providing a shared experience of virtual environments, comprising:
   a real-time 3D engine configured to maintain and render a virtual environment, thereby generating a plurality of visual components rendered for display and a shared acoustic component representing the virtual environment;

an output to connect the processing device to a plurality of client devices to continuously provide one of the plurality of visual components rendered for display to each client device for display on the client device;

an input to receive parameters for each client device, wherein the visual components are individualized by the processing device for the client device based on respective parameters of the client device, the parameters including location parameters, such that the client device need not itself render the visual component for display;

an output to connect the processing device to a sound device, wherein the shared acoustic component is generalized by the processing device based at least in part on the location parameters of a plurality of client devices, and wherein the shared acoustic component is provided to and reproduced on the sound device; and wherein the processing device is configured to synchronize the display of the plurality of visual components on respective client devices with the reproduction of the shared acoustic component by the sound device.

\* \* \* \* \*